May 6, 1930. W. M. MACK 1,757,462
FASTENER
Filed June 4, 1928
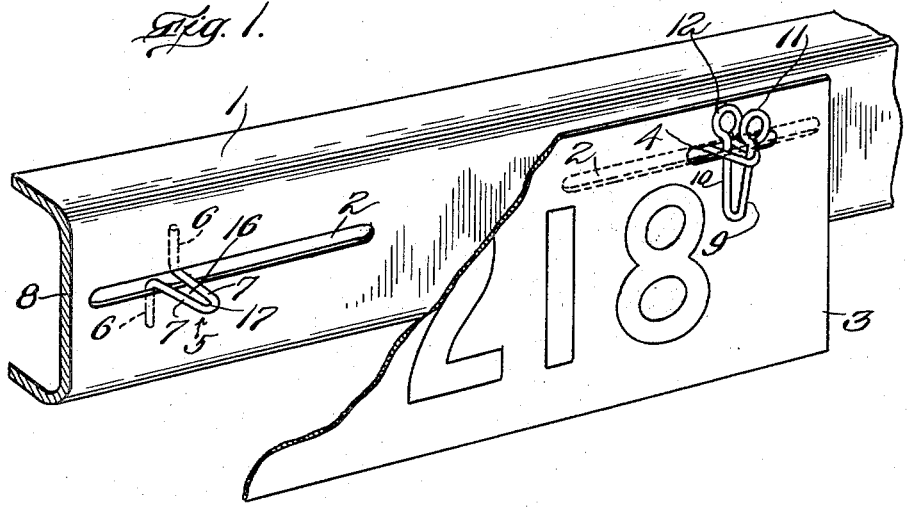
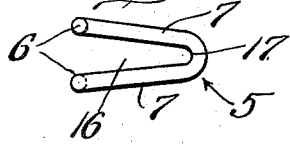
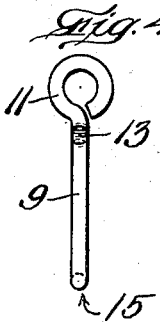
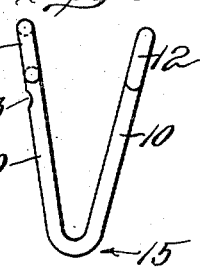
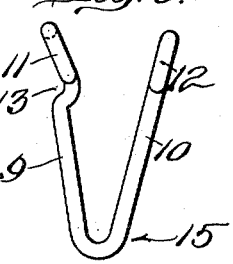
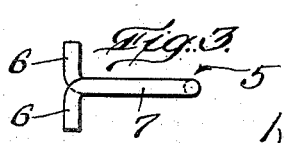
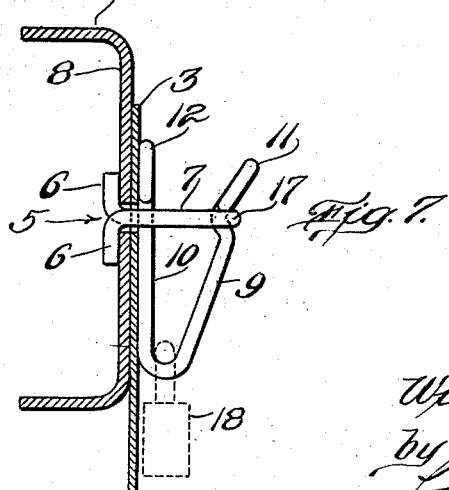
Inventor:
William M. Mack,
by Arthur L. Randall
atty.

Patented May 6, 1930

1,757,462

UNITED STATES PATENT OFFICE

WILLIAM M. MACK, OF SOUTH PARIS, MAINE

FASTENER

Application filed June 4, 1928. Serial No. 282,811.

My invention relates to fasteners and particularly to fasteners for use in securing number-plates in position upon automobiles, although the field of utility of my new fastener is not limited in this respect.

The object of my invention is to provide a secure, reliable and efficient device of simple and inexpensive construction which will securely hold a number-plate in position on its support without possibility of its working loose or rattling.

The usual method of fastening a number-plate in position on its support is by employment of bolts, which is objectionable for several reasons, among which may be noted that the nuts of the bolts sometimes work loose because of vibration, thereby freeing the number-plate. Also, through corrosion, rusting, and the like, the nuts often become "frozen" to the bolts so as to make it very difficult and sometimes impossible to remove the same without mutilation or destruction of some of the parts. My invention provides a fastener of very simple, inexpensive and efficient construction, by means of which the number-plate can be very quickly secured in position upon its support, or removed therefrom, and which when in use grips the number-plate very firmly, but with a yielding clamping pressure whereby the fastener fits itself to the thicknesses of the parts secured together by it, and also prevents relative vibratory movement thereof.

In the accompanying drawings:

Figure 1 is a perspective view of a portion of the number-plate supporting bar of an automobile showing the same equipped with my new fastener.

Figure 2 is a plan view of the bolt member of my new fastener.

Figure 3 is a side elevation of the bolt member shown in Figure 2.

Figure 4 is a front elevation of the spring latch member of my new fastener.

Figure 5 is a side elevation of the member shown in Figure 4.

Figure 6 illustrates a modification.

Figure 7 is a sectional detail illustrating the manner in which my new fastener is employed to secure a number-plate in position upon its support.

Having reference to the drawings, 1 represents the number-plate supporting bar of an automobile, said bar being usually constructed with slots 2, 2 for the reception of bolts by means of which the number-plate has heretofore been secured to the same. At 3 is shown a portion of a number-plate which, as usual, has its upper marginal portion made near each end of the plate with a horizontal slot 4.

In one preferred form my new fastener comprises but two parts, including a bolt member 5, Figures 2 and 3, which may be made from a length of spring brass wire bent upon itself at its middle into U-shape, and having an end portion 6 of each leg 7 bent laterally at approximately a right angle to said leg and in a direction that is perpendicular to the plane of the U-shaped body portion of said bolt member, each of said end portions 6 constituting a shoulder or abutment to fit against the rear side of the perpendicular wall 8 of the bar 1 when the body portion of said member made up of the legs 7, 7 is passed through one of the slots 2 of the plate-supporting bar 1 as shown at the left in Figure 1.

The other member of my new fastener may be made from another length of spring brass wire bent upon itself at its middle into more or less V-shape so as to provide two legs 9 and 10 which are relatively oblique. The free end portions of these two legs 9 and 10 are formed into eyes or loops 11 and 12, respectively, with the loop 12, at least, preferably disposed in a plane perpendicular to the plane of the two arms 9 and 10. Adjacent the loop or eye 11 of the leg 9 the latter is formed upon its outer side, in Figure 5, with a notch 13 that is created or produced by filing away a portion of said arm at that point.

As an alternative construction the notch 13 may be provided by bending the leg 9 of this member as at 14 so as to inwardly offset the loop 11 thereby creating an angle or notch 13 upon the outer side of the arm 9.

After the bolt member 5 is placed in position within the slot 2 as shown at the left in Figure 1, the number-plate 3 is then placed in position against the outer side of the wall 8 of supporting bar 1 with the legs 7, 7 of the bolt member 5 extending through one of its slots 4 thereof. Then the point of the V-shaped latch or spring bow member 15 is entered from above within the slot 16 between the legs 7 of the bolt member 5 and shoved downwardly until the notch 13 snaps into engagement with the end cross bar 17 of the bolt member 5. When the latch member 15 is thus forced downwardly in the slot 16 its two legs 9 and 10 are bent or flexed toward each other so that when the notch 13 is in engagement with the bolt member 5 the latch member 15 is under stress and serves to forcibly, though yieldingly, clamp the number-plate 3 tightly in position flatwise against the supporting bar 1.

It will be clear that as the latch member 15 is shoved downwardly into the slot 16 of the bolt member, the loop or eye 12 provides a laterally extending seat which, when the latch member occupies its final lowermost position, fits flatwise against the number-plate and holds the inner leg 10 of said member against slipping sidewise on plate 3 and also holds the same at the middle of slot 16.

By forming the member 5 so that the free ends of the two legs 7 are spaced apart as shown in Figure 2, the member 5 may be thereby made of greater width than the width of slot 2 so that it cannot rotate within the latter.

The above described fastener can be quickly and easily applied and removed; the cost of producing the same is very small, and the plate 3 cannot become loosened through shocks or vibration to which the automobile is subjected.

It will also be clear that unauthorized removal of the number-plate may be prevented, if desired, by securing an ordinary padlock to the spring bow latch member 15 after the fastener has been installed.

The above described fastener may, as will be obvious, be applied or removed without the use of tools such as a wrench or screwdriver, which is of course a feature of advantage.

The member 5 of my new fastener, as herein shown, is in the form of a staple, but it has all of the physical characteristics of a bolt, the laterally extending ends 6, 6 performing the function of the head of a bolt, while the two legs 7, 7 joined together at their outer ends by the bar 17 constitute a slotted bolt shank. The member 15 of the fastener functions as a latch or key which locks itself in its operative position within the slot 16 of the bolt member and serves as a spring clamp to hold the parts 3 and 8 firmly together.

The padlock referred to above, indicated by dotted lines at 18 in Figure 7, is not essential to my invention and is used only in cases where it is desired to prevent unauthorized removal of the number-plate.

The eye 11 provided at the free end of the arm 9 of the spring bow latch member 15 is for use as a finger-piece to which pressure may be manually applied when inserting or removing said member.

A feature of the above described fastener which characterizes my invention is that it consists of two members including a bolt member adapted to extend through registering apertures provided in the objects or parts that are to be fastened together and provided with abutments or shoulders at its opposite ends, one to co-operate with or engage one of said parts or objects and the other to co-operate with a more or less wedge-shaped spring latch member that is slid or placed in position under compression between said latter abutment or shoulder and the adjacent object or part so that it locks said bolt member in operative position and, with the assistance of the latter, clamps said parts or objects together, while at the same time automatically locking itself in its operative position, one of said members having a slot to receive the other member so that the two members are interlocked and the latch member thereby held against sidewise displacement relatively to the bolt member.

What I claim is:

1. A fastener comprising a bolt member consisting of a length of metal wire bent upon itself near its middle into U-shape and having its end portions bent oppositely at right angles to the plane of the body portion of said member, and a V-shaped spring bow latch member consisting of a length of metal wire bent upon itself near its middle adapted to be inserted under compression within said first member, so that its spring pressure is exerted longitudinally of the bolt member thereby to clamp together the parts to which the fastener is applied, one leg of said spring bow latch member being formed with a notch to engage said first member thereby to hold said spring bow latch member in position within said first member.

2. A fastener comprising a bolt member consisting of a U-shaped length of metal wire having oppositely bent end portions disposed at right angles to the plane of the body portion of said member, and a V-shaped spring bow latch member made from a length of metal wire adapted to be inserted under compression within said first mentioned U-shaped member, so that its spring pressure is exerted longitudinally of the bolt member thereby to clamp together the parts to which the fastener is applied, one of the legs of said second V-shaped member being formed to interlock with said U-shaped member thereby to hold itself in position within the same.

3. A fastener comprising a bolt member consisting of a U-shaped length of wire having its opposite end portions bent laterally in opposite directions at right angles to the plane of the body portion thereof, and a V-shaped spring bow latch member adapted to be inserted under compression within said U-shaped member, so that its spring pressure is exerted longitudinally of the bolt member thereby to clamp together the parts to which the fastener is applied, one leg of said V-shaped spring bow latch member having provision for interlocking with said U-shaped member thereby to hold itself in position within the latter and having its end portion formed into an eye to serve as a thumb-piece.

4. A fastener comprising a bolt member consisting of a U-shaped length of wire having its opposite end portions bent laterally in opposite directions at right angles to the plane of the body portion thereof, and a V-shaped spring bow latch member made from a length of wire adapted to be inserted under compression within said U-shaped member, so that its spring pressure is exerted longitudinally of the bolt member thereby to clamp together the parts to which the fastener is applied, said V-shaped member having one leg thereof provided with means for engaging said U-shaped member to hold itself within the latter, and the end portions of both legs of said V-shaped member being formed into eyes each in a plane at a right angle to the plane of the body portion of said V-shaped member.

5. A fastener of the class described comprising a bolt member consisting of a U-shaped length of wire having its opposite end portions bent laterally in opposite directions at right angles to the plane of the body portion thereof so as to provide two legs of equal length, and a V-shaped spring wire bow latch member adapted to be inserted under compression within said U-shaped member so that its spring pressure is exerted longitudinally of the bolt member thereby to clamp together the parts to which the fastener is applied, one leg of said V-shaped member being formed upon its outer side with a shoulder for engaging said U-shaped member to hold itself within the latter and having its free end portion formed into an eye disposed in a plane at right angles to the plane of the body portion of said V-shaped member, and the other leg of said V-shaped member having its free end portion formed into an eye also disposed in a plane at right angles to the plane of the body portion of said V-shaped member so as to fit flatwise against the adjacent one of said parts while interlocked with the bolt member and also while being slid on said part into and out of said bolt member.

Signed by me at South Paris, Maine, this 15th day of May, 1928.

WILLIAM M. MACK.